(12) United States Patent
Draluk et al.

(10) Patent No.: US 7,499,950 B2
(45) Date of Patent: Mar. 3, 2009

(54) SYSTEM AND METHOD FOR PROVIDING DATA STORAGE THROUGH A DEVICE MANAGEMENT TREE USING NON-DEVICE MANAGEMENT AGENTS

(75) Inventors: Vadim Draluk, Cupertino, CA (US); John D. Bruner, South Barrington, IL (US); Boris Klots, Belmont, CA (US); Dmitri R. Latypov, San Mateo, CA (US); Denis A. Petushkov, Sunnyvale, CA (US); Yongyong Xu, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 607 days.

(21) Appl. No.: 11/024,895

(22) Filed: Dec. 29, 2004

(65) Prior Publication Data

US 2005/0234967 A1 Oct. 20, 2005

Related U.S. Application Data

(63) Continuation-in-part of application No. 10/826,833, filed on Apr. 16, 2004.

(51) Int. Cl.
*G06F 17/00* (2006.01)
(52) U.S. Cl. .................................. 707/104.1
(58) Field of Classification Search .............. 707/3, 707/10, 104.1; 709/202, 223, 225; 717/168, 717/171, 172, 173; 719/317; 455/3.01, 3.03
See application file for complete search history.

(56) References Cited

U.S. PATENT DOCUMENTS

| 6,594,666 | B1 | 7/2003 | Biswas et al. | |
|---|---|---|---|---|
| 6,718,371 | B1 | 4/2004 | Lowry et al. | |
| 2004/0098715 | A1* | 5/2004 | Aghera et al. | 717/173 |
| 2005/0010585 | A1* | 1/2005 | Sahinoja et al. | 707/100 |
| 2005/0055397 | A1* | 3/2005 | Zhu et al. | 709/200 |
| 2005/0114504 | A1* | 5/2005 | Marolia et al. | 709/224 |

OTHER PUBLICATIONS

State et al, "Management of Wireless Dynamic Infrastructures", IEEE 2003, 6 pages.*

* cited by examiner

*Primary Examiner*—Uyen T Le
(74) *Attorney, Agent, or Firm*—Hisashi D. Watanabe (57) ABSTRACT

A client device (701) of a communication system (700) includes, for example, a processor (304) programmed to include a device management tree interface (702) that provides access for a plurality of non device management agents (210, 618) and at least one device management agent (208) to a device management engine (222) that accesses a corresponding device management tree (226). The processor updates data, for the plurality of non device management agents and at least one device management agent, via the device management engine (222) and corresponding device management tree (226), through the device management tree interface (702).

15 Claims, 7 Drawing Sheets

502 ~ <CHARACTERISTIC TYPE="SYNCML-DM">
  504 ~ <PARM NAME="URI" VALUE="./DEVDETAIL/EXT/CONF/LOG"/>
  506 ~ <CHARACTERISTIC TYPE="SYNCML-DM">
    508 ~ <PARM NAME "URI" VALUE="FILENAME"/>
    510 ~ <PARM NAME "OP" VALUE="REPLACE"/>
    512 ~ <PARM NAME "DATA" VALUE="LOG.TXT"/>
  514 ~ </CHARACTERISTIC>
  516 ~ <CHARACTERISTIC TYPE="SYNCML-DM">
    518 ~ <PARM NAME "URI" VALUE="LEVEL"/>
    520 ~ <PARM NAME "OP" VALUE="REPLACE"/>
    522 ~ <PARM NAME "DATA" VALUE="3"/>
  524 ~ </CHARACTERISTIC>
526 ~ </CHARACTERISTIC>

SYSTEM AND METHOD FOR PROVIDING DATA STORAGE THROUGH A DEVICE MANAGEMENT TREE USING NON-DEVICE MANAGEMENT AGENTS

RELATED CO-PENDING APPLICATION

This is a continuation in part application of co-pending application entitled "System and Method for Provisioning Device Management Tree Parameters Over a Client Provisioning Protocol" filed on Apr. 16, 2004, having Ser. No. 10/826,833, having as inventors Draluk et al., and assigned to instant assignee.

FIELD OF THE INVENTION

The present invention relates generally to the field of systems and methods for managing mobile electronic devices from a central location. More particularly, the present invention relates to a system and method for updating a device management tree in a client device.

BACKGROUND OF THE INVENTION

Computing devices may have different capabilities and features based on the applications installed in their memory. The applications may be pre-installed to a computing device before purchase by a customer or installed after purchase by a customer or service technician via a storage media, such as a magnetic or optical disk. For computing devices that communicate with a computer network, applications may be installed after a customer or service technician downloads the applications to the computing device.

Installations of applications and updates on client devices present other issues that are not a concern for wired devices. Users of client devices frequently need access to a variety of information, but such information is not as readily available as wired connections due to the limited bandwidth of wireless connections. Also, the traffic experienced by a client device should be minimized in order to minimize power drain on the device's power source. Thus, communications are challenged to maximize the quality of information provided to client devices while minimizing the traffic imposed on the wireless connections to the devices.

A communication that utilizes a large number of applications must have the capability of managing the applications efficiently and proficiently. Two of the more important functions of these systems are client provisioning and device management. Generally, these functions operate independently (with the exception of the WAP profile used in SyncML device management bootstrapping). On the other hand, there are advantages for client provisioning and device management to converge. As application data protocols, both functions are typically generic and, thus, they are quite similar. The major difference between client provisioning and device management is at the level of transport protocols, where client provisioning is confined to a certain type. Thus, the amount and complexity of data that can be provisioned is limited.

Also, other nondevice management agents (e.g. software applications) in addition to client provisioning applications are also used on mobile client devices. For example, device configuration agents typically use different paths and mechanisms to access (e.g. read or write) device management data that is stored in varying locations and different databases leading to complexities and inconsistencies. The open mobile alliance (OMA) device management standard employs application level protocol (syncML DM), with transport protocol bindings (WAP, HTTP, OBEX) and a meta-data model called a device management tree (DMT) and also a small data model that maps some basic device configuration information on to the device management tree. However, the device management tree is designed to be used only with the device management user agent. At the same time other device management protocols and agents may exist on the same device and store and read data, such as client provisioning agents, device setting applications that may set for example the colors of a user interface, and other applications.

Figure 6:
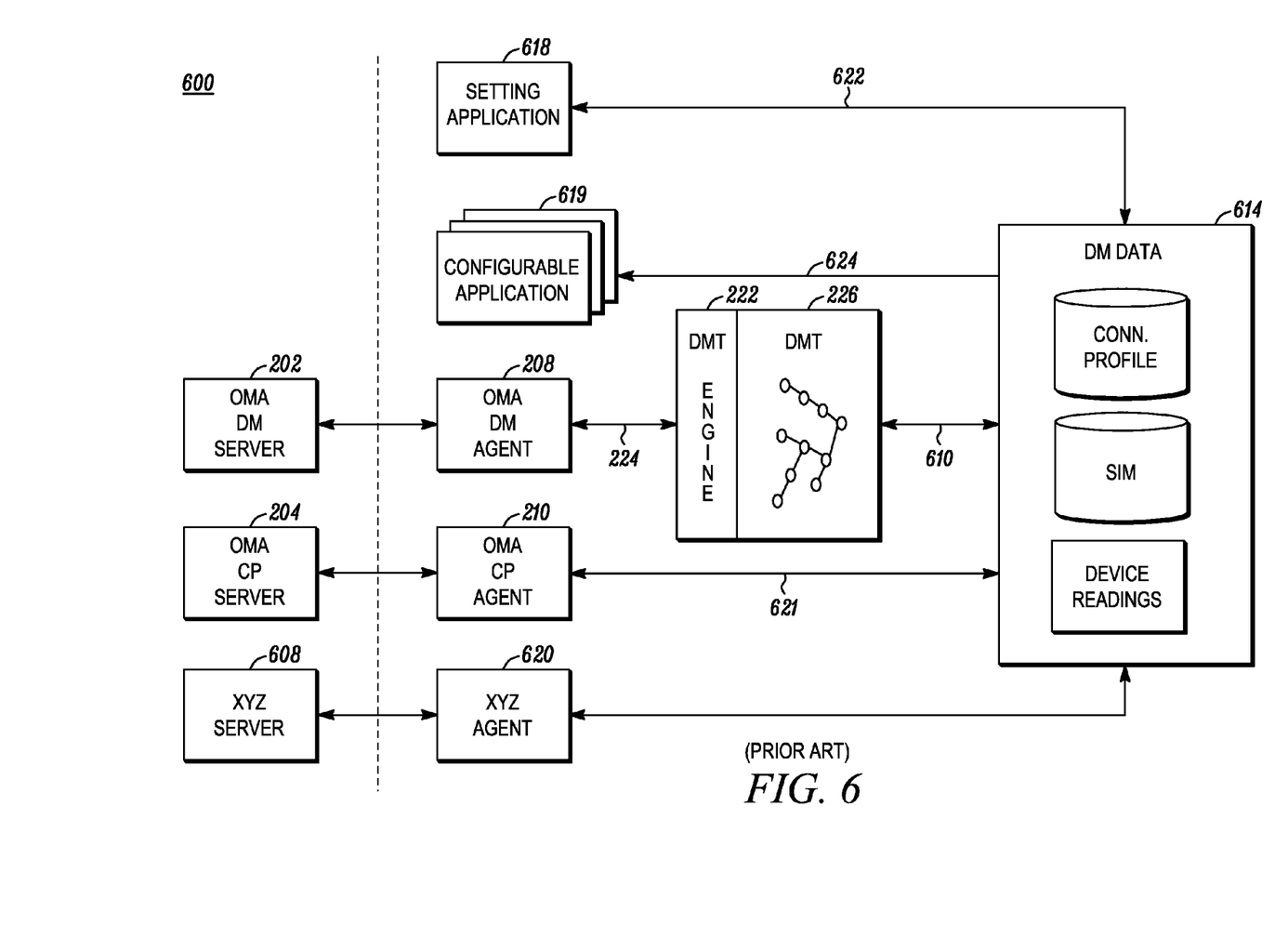
FIG. 6 is a functional block diagram illustrating one example of a prior art system employing over the air device management and device configuration.

For example, FIG. 6 illustrates an example of a prior art device management and provisioning architecture. A wireless client device 600 may be in wireless communication with one or more servers such as an OMA DM server 200, an OMA client provisioning server 204, and other device management servers that may be built according to various other standards shown as server 608. The wireless client device 600 includes an OMA DM agent 208 which communicates with a device management tree 226 (DMT) through a device management engine 222 and communication link 224 (e.g., program calls). The device management tree 226 is a hierarchical metadata structure that stores data such as device management data in a device management data store 614 through a communication link 610. In addition, nondevice management applications or agents such as an OMA CP agent 210 may also store for example provisioning data in the data store 614 but in a separate database or using metadata models different from the DMT meta-data model and through another communication path 621. Similarly a setting application or agent 618 may store device or graphic user interface settings or other data in the DM data store 614 through a communication link 622 but bypassing the DM engine 222. One or more configurable applications or agents 619 may read data from the DM store 614 through yet a different communication path 624. The DM data store may include various data (in databases if desired) such as but not limited to connectivity profiles, subscriber identity module (SIM) data and a set of parameters that reflect the dynamic state of the device referred to as "device readings" information.

As such, multiple agents may bypass the DMT 226 and store data in one more different databases and with different formatting. Hence, the data may not be synchronized and may be corrupted because there is no locking built in (e.g. multiple writes could potentially occur). In addition, the DMT controls the storage of data in a hierarchical fashion and is not typically used in the course of running an application. Also, device settings are typically stored in proprietary locations and other applications may not know where the device settings are located. In addition, other agents may store data in the DM data store 614 but not in an understood manner so that the data cannot be found by other agents. Conventional systems typically require that only the DM agent can utilize the DMT 226. Accordingly, there is a need to provide an apparatus and methods that overcome one or more of the above drawbacks.

DETAILED DESCRIPTION OF THE PREFERRED EMBODIMENTS

Briefly, a wireless client device and method therefor employs a device management interface through which a plurality of nondevice management agents, such a software applications, and at least one device management agent, such as an OMA DM agent, or any other suitable device management agent, accesses a device tree management tree engine and corresponding device management tree. Data, updated by the plurality of non-device management agents are updated through the shared device management tree by the device management engine through the device management tree interface. In addition, the device management agent also updates data in the data store using the same device management application programming interface. The device management tree interface may be implemented as a programmed processor that provides a device management API layer or a set of APIs. As such, a single access path through the DMT interface allows the guarantee of device management data integrity and efficient access to a data store by multiple agents including nondevice management agents.

In addition, access authorization based on a device management tree Access Control List (ACL) mechanism makes data enforcement generic and independent of particular applications or agents. In addition, meta-data value constraints may be universally enforced whether the data change is performed by a settings application, or by a customer care agent over the air, or through any other suitable nondevice management agent. Agents have a consistent and more uniform view of DM data independent of the data's physical nature and location. Other advantages will be recognized by those of ordinary skill in the art.

In one embodiment, the device management tree interface provides access points for the plurality of nondevice management agents and at least one device management agent, to a device management engine that accesses the corresponding device management tree. A nondevice management agent may include a client provisioning agent and client device settings agent, or any other suitable agents. The device management tree engine handles multiple device management tree queries from the plurality of both nondevice management agents and the at least one device management agent. The DMT defines a searchable hierarchical tree structure for storing data in a database according to meta-data constraints. The nondevice management agents and the device management agent may include JAVA applications and the client device as noted below may use a Linux operating system.

In one embodiment, the wireless client device includes a wireless transceiver, a processor, which as noted below may include any combination of circuits or other structure, including multiple processing elements or a single processing element. The processor is operably coupled to the wireless transceiver and to memory that contains executable instructions that when executed by the processor cause the processor to operate as noted above. In addition, discrete logic, such as state machines or other logic may also be used to employ the functions and operations described herein.

In another embodiment, client provisioning and device management functions may be combined by defining client provisioning characteristics and parameters that would operate over a device management tree (DMT). For example, Open Mobile Alliance Client Provisioning (OMA CP) characteristics and parameters may be mapped to a DMT to create a new characteristic, namely synchronized markup language-device management (SYNCML-DM), which is recursive. Thus, communication service providers may have a generic and simple parameter provisioning mechanism using existing communication infrastructure. The mechanism would enable the communication service provider to perform provisioning while a user of a client device is communicating with a customer care representative of the communication service provider. The customer care representative would be able to address the user's problems efficiently and provide maximum satisfaction of user experience to the user.

One aspect of the present invention is a method for a client device of a communication system. The client device receives a client provisioning document from a source. The client device then identifies a device management characteristic from the client provisioning document. Thereafter, the client device stores data based on the device management characteristic of the client provisioning document to a device management tree.

Another aspect of the present invention is a client device of a communication system comprising a provisioning and management framework. The framework receives a client provisioning document from a source, and the client provisioning document includes a device management characteristic.

Figure 1:
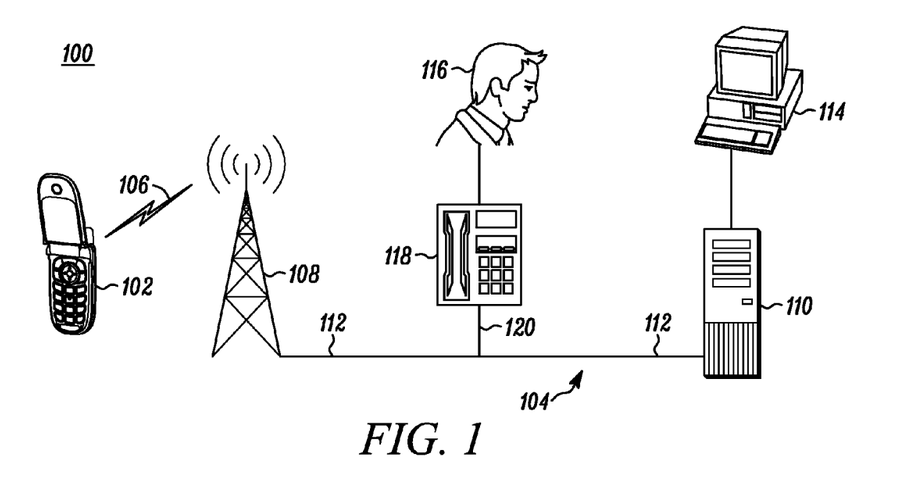
FIG. 1 is a schematic view illustrating an embodiment of a communication system in accordance with the present invention.

Referring to FIG. 1, there is provided a schematic view illustrating a first embodiment 100 of a communication system. The first embodiment 100 includes a client device 102 communicating with a wireless communication network 104 through a wireless link 106. Any type of wireless link 106 may be utilized for the present invention, but it is to be understood that a high speed wireless data connection is preferred. For example, the wireless communication network 104 may communicate with a plurality of client devices, including the client device 102, via a cellular-based communication infrastructure that utilizes a cellular-based communication protocols such as Advanced Mobile Phone System (AMPS), Code Division Multiple Access (CDMA), Time Division Multiple Access (TDMA), Global System For Mobile Communications (GSM), Integrated Digital Enhanced Network (iDEN), General Packet Radio Service (GPRS), Enhanced Data for GSM Evolution (EDGE), Universal Mobile Telecommunications System (UMTS), Wideband Code Division Multiple Access (WCDMA) and their variants. The wireless communication network 104 may also communicate with the plurality of client devices via a peerto-peer or ad hoc system utilizing appropriate communication protocols such as Bluetooth, IEEE 802.11, IEEE 802.16, and the like.

The wireless communication network 104 may include a variety of components for proper operation and communication with the client device 102. For example, for the cellular-based communication infrastructure shown in FIG. 1, the wireless communication network 104 includes at least one base station 108 and a server 110. Although a variety of components may be coupled between one or more base stations 108 and the server 110, the base station and server shown in FIG. 1 is connected by a single wired line 112 to simplify this example.

The server 110 is capable of providing services requested by the client device 102. For example, a user of the device 102 may send a request for assistance, in the form of a data signal (such as text messaging), to the wireless communication network 104, which directs the data signal to the server 110. In response, the server 110 may interrogate the device and/or network state and identify one or more solutions. For those solutions that require change or correction of a programmable module of the device 102, the server 110 may send update data to the device via the wireless link 106 so that the programmable module may be updated to fulfill the request. If multiple solutions are available, then the server 110 may send these options to the device 102 and await a response from the device before proceeding.

The first embodiment 100 may also include an operator terminal 114, managed by a service person 116, which controls the server 110 and communicates with the device 102 through the server. When the server 110 receives the request for assistance, the service person may interrogate the device and/or network state to identify solution(s) and/or select the best solution if multiple solutions are available. The service person 116 may also correspond with the device 102 via data signals (such as text messaging) to explain any issues, solutions and/or other issues that may be of interest the user of the device.

The first embodiment 100 may further include a voice client device 118 connected to the rest of the wireless communication network 104 via a wired or wireless connection, such as wired line 118, and is available for use by the service person 116. The voice client device 118 may also connect to the network via the server 110 or the operator terminal 114. Thus, in reference to the above examples, a user of the device 102 may send a request for assistance, in the form of a voice signal, to the wireless communication network 106, which directs the data signal to the server 110. While the server 110 and or the service person 116 is interrogating the device and/or network state, identifying one or more solutions, and/or selecting an appropriate solution, the service person may correspond with the device 102 via voice signals to explain any issues, solutions and/or other issues that may be of interest the user of the device.

Figure 2:
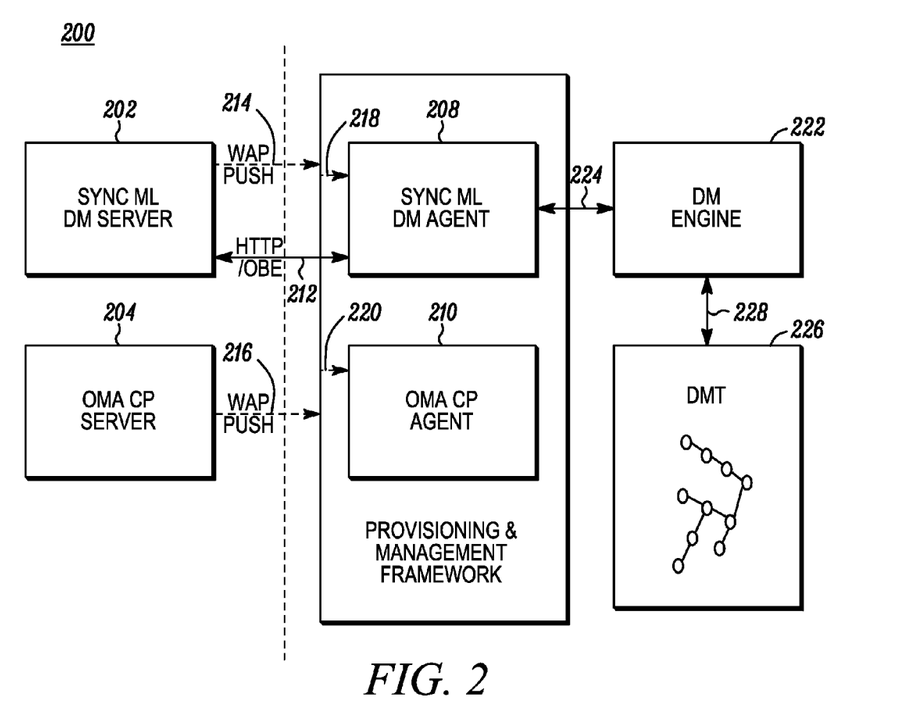
FIG. 2 is a schematic view illustrating another embodiment of the communication system in accordance with the present invention.

Referring to FIG. 2, there is provided a schematic view illustrating a second embodiment 200 of the communication system. For this system, client provisioning and device management are converged. An example of client provisioning is OMA CP, and an example of device management is SyncML DM. As application data protocols, they are similarly generic, though device management tends to have a meta-data model that is missing from client provisioning.

The major difference comes at the level of transport protocols. For the example shown in FIG. 2, the OMA CP is confined to Wireless Application Protocol Push (WAP Push), which may limit the amount and complexity of data that may be provisioned. On the other hand, the ability to perform provisioning while in-call, and without opening a data connection, may be a significant benefit for the communication service provider. The present invention is not limited to the embodiments shown. For example, SyncML DM binding over short message service (SMS) may be implemented. Preferably, to minimize additional cost, the device management may be implemented on existing infrastructure commonly used by communication service providers, such as OMA CP.

The client provisioning characteristics and parameters may be defined so that they may operate over the device management tree. A single new characteristic which is recursive may be utilized and is referenced herein as SYNCML-DM. The parameter names include, but are not limited to, a uniform resource identifier (URI) parameter, an operational (OP) parameter and a DATA parameter. The URI parameter is a sync node device management URI. An actual URI may be calculated as concatenation of URI's of nested characteristics and is the only parameter appearing in non-inner-most characteristics. The OP parameter is a node operation, with possible values such as ADD, REPLACE, DELETE and EXECUTE. The DATA parameter is data that may be applied by the operation, if any.

As shown in FIG. 2, the second embodiment 200 includes components at the network 104 and components at one or more client devices 102. Each component may be a separate device, controller or server, or two or more components may be combined within the same device, controller or server. The components at the network 104 include a device management server 202, such as a SyncML DM server, and a client provisioning server 204, such as an OMA CP server. The components at the client device 102 include a provisioning and management framework 206, which includes a device management agent 208 and a client provisioning agent 210. For one embodiment, the device management agent 208 and the client provisioning agent 210 are managed by a parameter management frame of the provisioning and management framework 206.

The device management server 202 of the network 104 communicates with the device management agent 208 of the client device via communication link 212. For one embodiment, the signal protocol between the servers 202, 204 and the agents 208, 210 is a Hyper Text Transfer Protocol/Object Exchange (HTTP/OBEX). The provisioning and management framework 206 also receives sync signals, in the form of WAP Push, from the device management server 202 via connection link 214 and provides the incoming device management signals to the device management agent 208 via connection link 218. Likewise, the provisioning and management framework 206 further receives provisioning signals, in the form of WAP Push, from the client provisioning server 204 via connection link 216 and provide the incoming provisioning signals to the client provisioning agent 210 via connection link 220.

The client device further includes a device management engine 222 communicating with the device management agent 208 via connection link 224 and a device management tree 226 communicating with the device management engine via communication link 228.

Figure 3:
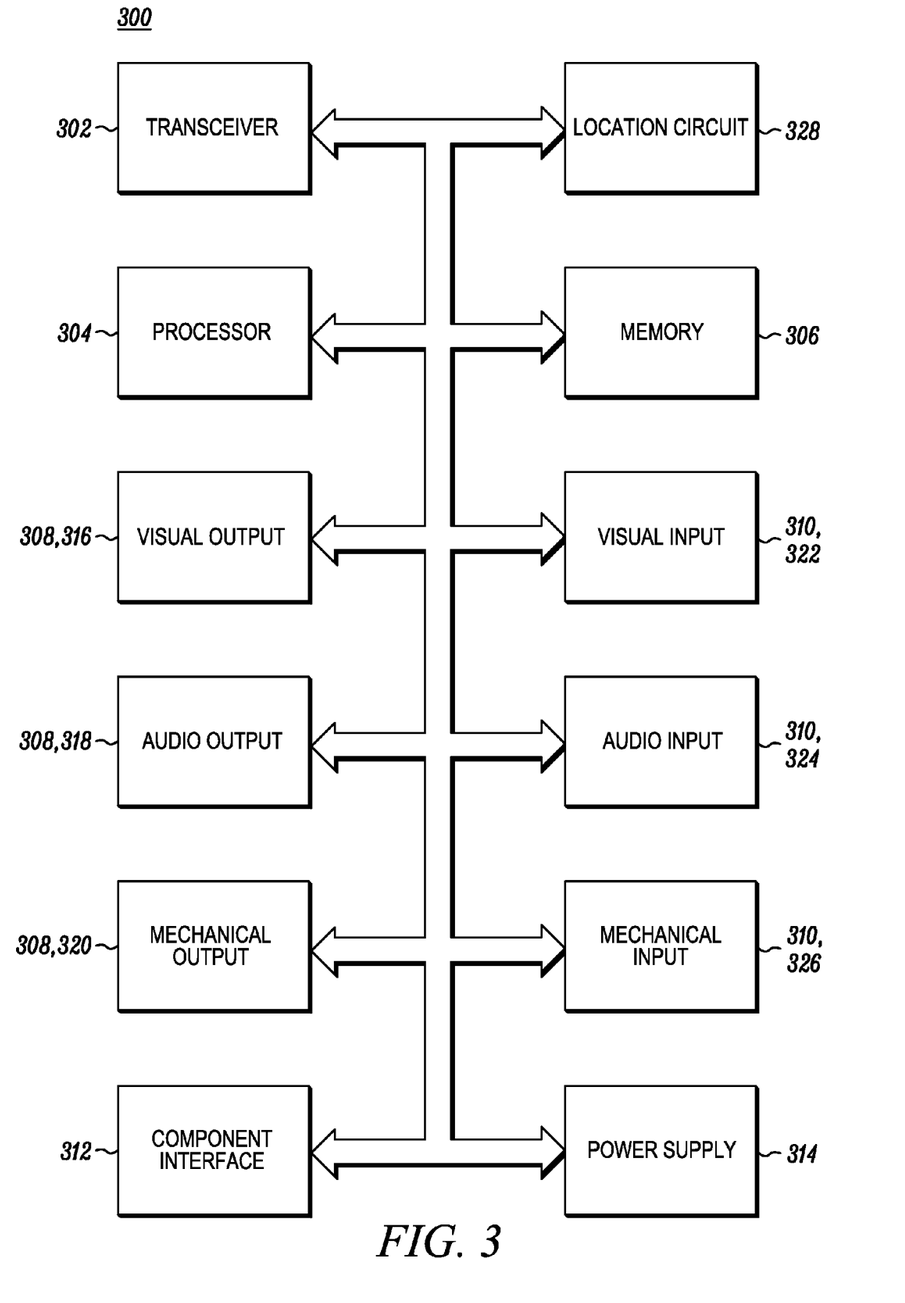
FIG. 3 is a block diagram illustrating exemplary internal components of various servers, controllers and devices that may utilize the present invention.

Referring to FIG. 3, there is provided a block diagram illustrating exemplary internal components of various servers, controllers and devices that may utilize the present invention, such as the client device 102 and the server 110 of FIG. 1. The exemplary embodiment includes one or more transceivers 302, a processor 304, a memory portion 306, one or more output devices 308, and one or more input devices 310. Each embodiment may include a user interface that comprises at least one input device 310 and may include one or more output devices 308. Each transceiver 302 may be a wired transceiver, such as an Ethernet connection, or a wireless connection such as an RF transceiver. The internal components 300 may further include a component interface 312 to provide a direct connection to auxiliary components or accessories for additional or enhanced functionality. The internal components 300 preferably include a power supply 314, such as a battery, for providing power to the other internal components while enabling the server, controller and/or device to be portable.

Referring to the client device 102 and the server 110 of FIG. 1, each machine may have a different set of internal components. Each server 110 may include a transceiver 302, a processor 304, a memory 306 and a power supply 314 but may optionally include the other internal components 300 shown in FIG. 2. The memory 306 of the servers 110 should include high capacity storage in order to handle large volumes of media content. Each client device 102 must include a transceiver 302, a processor 304, a memory 306, one or more output devices 308, one or more input devices 310 and a power supply 314. Due to the mobile nature of the client device 102, the transceiver 302 should be wireless and the power supply should be portable, such as a battery. The component interface 312 is an optional component of the client device 102.

The input and output devices 308, 310 of the internal components 300 may include a variety of visual, audio and/or mechanical outputs. For example, the output device(s) 308 may include a visual output device 316 such as a liquid crystal display and light emitting diode indicator, an audio output device 318 such as a speaker, alarm and/or buzzer, and/or a mechanical output device 320 such as a vibrating mechanism. Likewise, by example, the input devices 310 may include a visual input device 322 such as an optical sensor (for example, a camera), an audio input device 324 such as a microphone, and a mechanical input device 326 such as a flip sensor, keyboard, keypad, selection button, touch pad, touch screen, capacitive sensor, motion sensor, and switch.

The internal components 300 may include a location circuit 328. Examples of the location circuit 328 include, but are not limited to, a Global Positioning System (GPS) receiver, a triangulation receiver, an accelerometer, a gyroscope, or any other information collecting device that may identify a current location of the device.

The memory portion 306 of the internal components 300 may be used by the processor 304 to store and retrieve data. The data that may be stored by the memory portion 306 include, but is not limited to, operating systems, applications, and data. Each operating system includes executable code that controls basic functions of the client device, such as interaction among the components of the internal components 300, communication with external devices via the transceiver 302 and/or the component interface 312, and storage and retrieval of applications and data to and from the memory portion 306. Each application includes executable code utilizes an operating system to provide more specific functionality for the client device, such as file system service and handling of protected and unprotected data stored in the memory portion 306. Data is non-executable code or information that may be referenced and/or manipulated by an operating system or application for performing functions of the client device.

The processor 304 may perform various operations to store, manipulate and retrieve information in the memory portion 306. Each component of the internal components 300 is not limited to a single component but represents functions that may be performed by a single component or multiple cooperative components, such as a central processing unit operating in conjunction with a digital signal processor and one or more input/output processors. Likewise, two or more components of the internal components 300 may be combined or integrated so long as the functions of these components may be performed by the client device.

Figure 4:
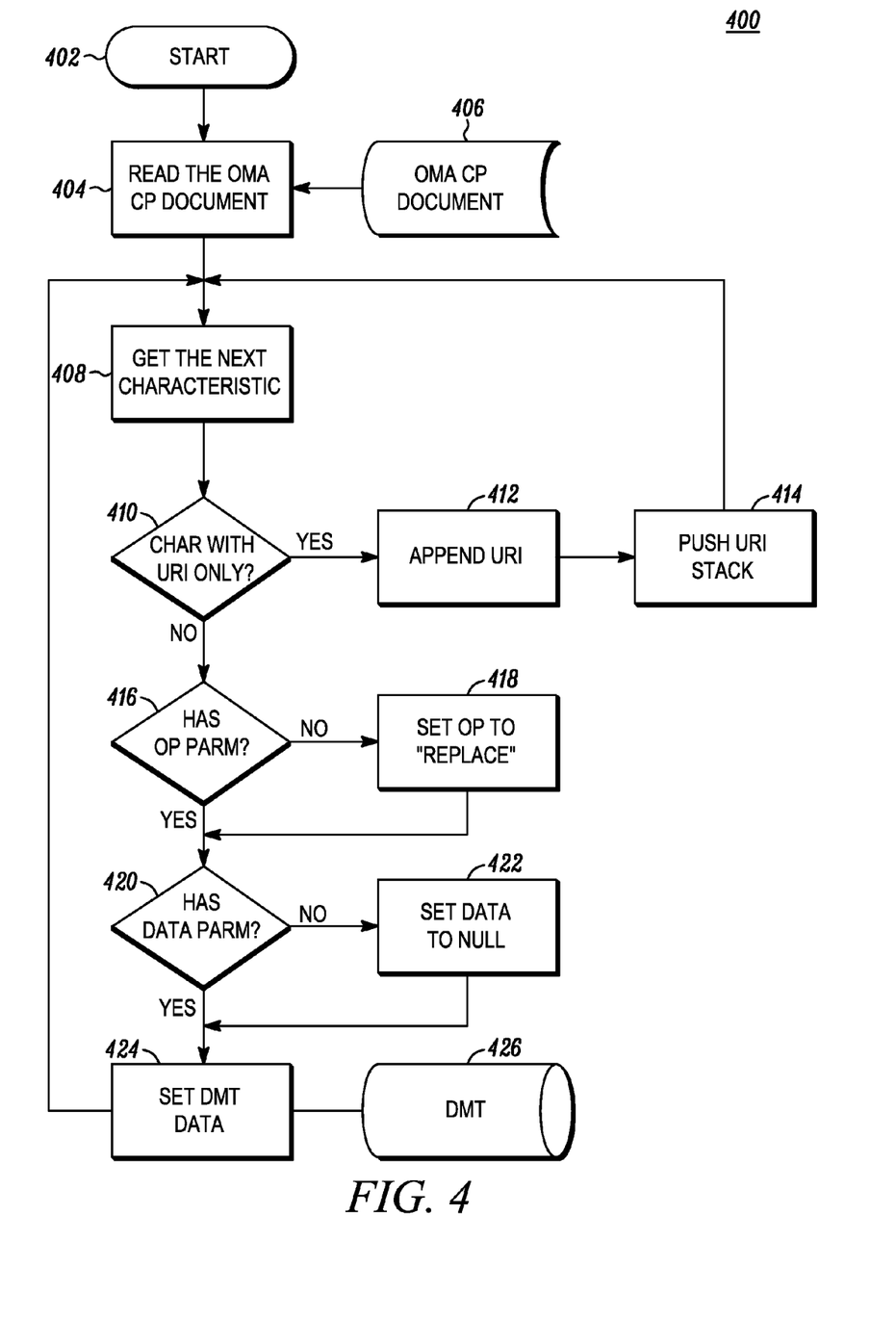
FIG. 4 is a flow diagram representing an exemplary operation of a client device in accordance with the present invention.

Referring to FIG. 4, there is provided a flow diagram representing an exemplary operation 400 of a client device. The exemplary operation 400 begins at step 402. Next, the client device receives a client provisioning document, such as an OMA CP document, from a source 406, such as the OMA CP server 204, and reads the client provisioning document at step 404. The client device then identifies a characteristic from the client provisioning document at step 408.

After identifying a characteristic at step 408, the client device determines whether the characteristic includes a URI parameter but does not include an OP parameter or a DATA parameter at step 410. If the characteristic only includes a URI parameter, then the client device appends the URI parameter at step 412, stores the URI parameter by pushing it down on a URI stack at step 414, and returns to step 408 where the client device identifies the next characteristic from the client provisioning document.

If the client device determines that the characteristic does not only include a URI parameter at step 410, then the client device determines whether the characteristic includes an OP parameter at step 416. If not, then the client device sets the OP parameter to "REPLACE" at step 418 and thereafter determines whether the characteristic includes a DATA parameter step 420. If the characteristic does include an OP parameter, then the client device proceeds directly to step 420 without updating the OP parameter.

The client device determines whether the characteristic includes a DATA parameter at step 420. If not, then the client device sets the DATA parameter to a NULL value at step 422 and sets device management tree (DMT) data at step 424. If the characteristic does include a DATA parameter, then the client device proceeds directly to step 424 to set the DMT data. To set the DMT data at step 424, the client device provides the data to the device management tree 226 (shown in FIG. 2). Thereafter, the client device returns to step 408 where the client device identifies the next characteristic from the client provisioning document. The exemplary operation continues until all characteristics of the client provisioning document have been reviewed.

Figure 5:
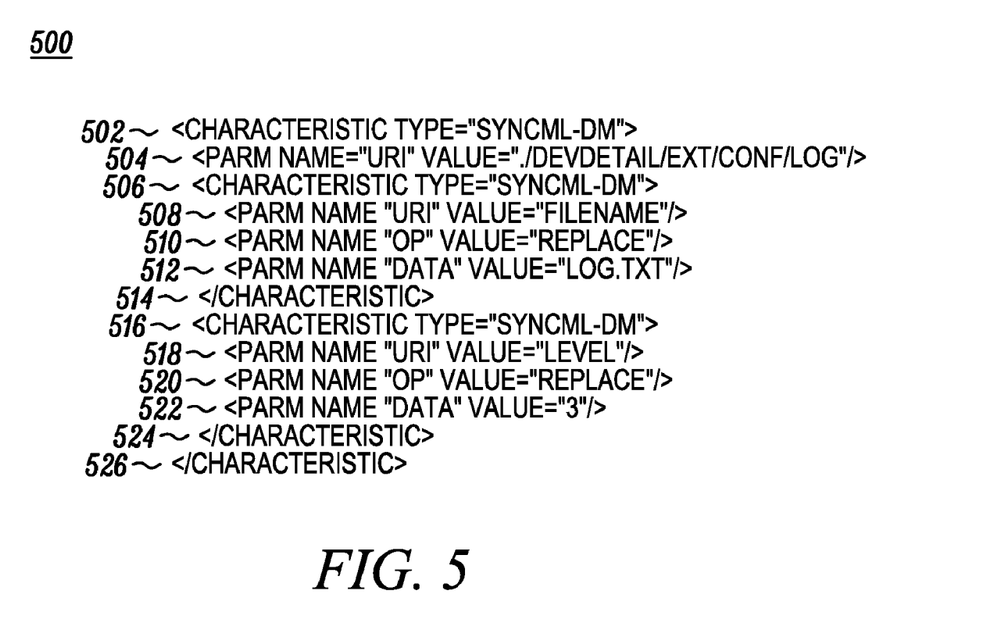
FIG. 5 is a code diagram illustrating an exemplary data format that may be processed by the client device in accordance with the present invention.

Referring to FIG. 5, there is provided a code diagram illustrating an exemplary data format 500 that may be processed by the client device. It is to be understood that FIG. 5 merely represents an example of the type of data format that may be utilized by the embodiments shown and described herein, and the type of data format is not limited to the one shown in FIG. 5. FIG. 5 shows an example of package setting log parameters which may be encoded in accordance with the present invention. The first line 502 of the exemplary data format 500 identifies the characteristic type of a first node to be SYNCML-DM. The second line 504 of the exemplary data format 500 sets the URI parameter of the first node to be "./DevDetail/Ext/Conf/Log".

The third line 506 of the exemplary data format 500 identifies a second node, nested within the first node, having a characteristic type of SYNCML-DM. The fourth line 508 sets the URI parameter of the second node to be "FileName", the fifth line 510 sets the OP parameter of the second node to be "REPLACE", and the sixth line 512 sets the DATA parameter of the second node to be "log.txt". The seventh line 514 refers back to line 506 and indicates the end of all descriptions of the second node.

The eighth line 516 of the exemplary data format 500 identifies a third node, nested within the first node along with the second node, having a characteristic type of SYNCML-DM. The ninth line 518 sets the URI parameter of the third node to be "Level", the tenth line 520 sets the OP parameter of the third node to be "REPLACE", and the eleventh line 522 sets the DATA parameter of the second node to be "3". The twelfth line 524 refers back to line 516 and indicates the end of all descriptions of the third node. Likewise, the thirteenth line 526 refers back to line 502 and indicates the end of all descriptions of the first node and its nested sub-nodes.

Figure 7:
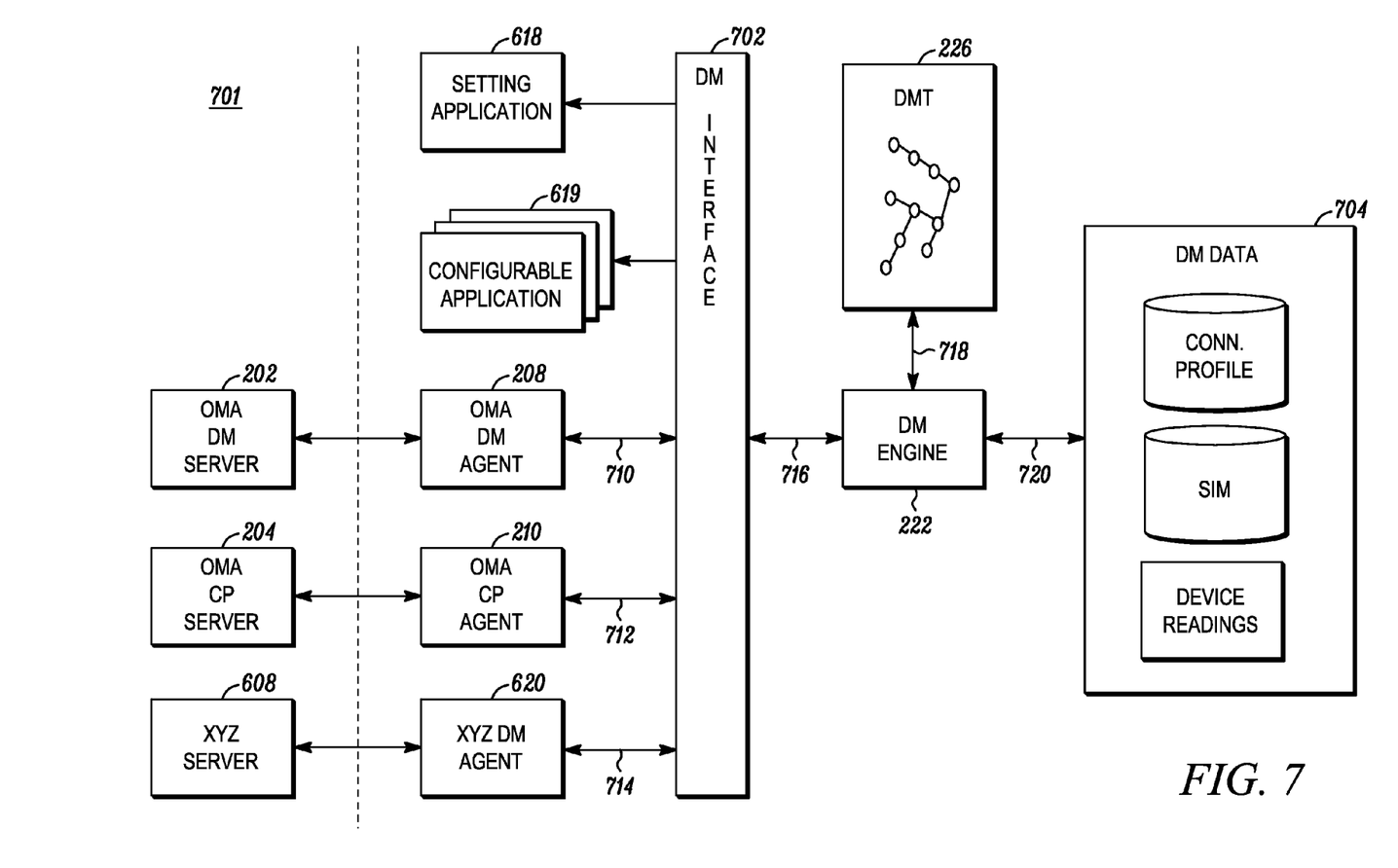
FIG. 7 is a functional block diagram illustrating one example of a wireless client device in communication with one or more servers via a wireless communication in accordance with one embodiment of the invention.

FIG. 7 is a schematic view illustrating one example of a communication system 700 in accordance with another embodiment of the invention. It will be recognized that the system need not employ the communication operation as described with reference for example to FIGS. 1-5 but may do so if desired. For example; client provisioning and device management need not be converged. As shown, the communication system 700 includes the network elements 202 and 204, as previously noted, that may be capable of wirelessly communicating with wireless client device 701. Client device 701 includes a device management application programming interface 702 that is called or otherwise invoked by both multiple nondevice management agents and any desired management agents. Examples of non-device management agents in this figure are setting application 618, configurable application 619, OMA CP agent 210 and any other suitable agent designated as 620. The device management tree interface 702 may be part of an API layer, may be a set of APIs so that each agent may call an associated device management API to update or otherwise access data stored in DM data store 704 by the DMT engine 222 under control of the device management tree 226 or may take any other suitable form. The DM data store or memory 704 stores data in a manner defined by the device management tree 226 since all agents access the device management data store 704 through a common device management tree interface 702 that calls the DMT engine and DMT.

The device management tree interface 702 may be implemented in any suitable manner and in this example is a software application stored in memory that is executed by a processor. The DM data store 704 may, for example, be memory 306 or any other memory as desired.

Figure 8:
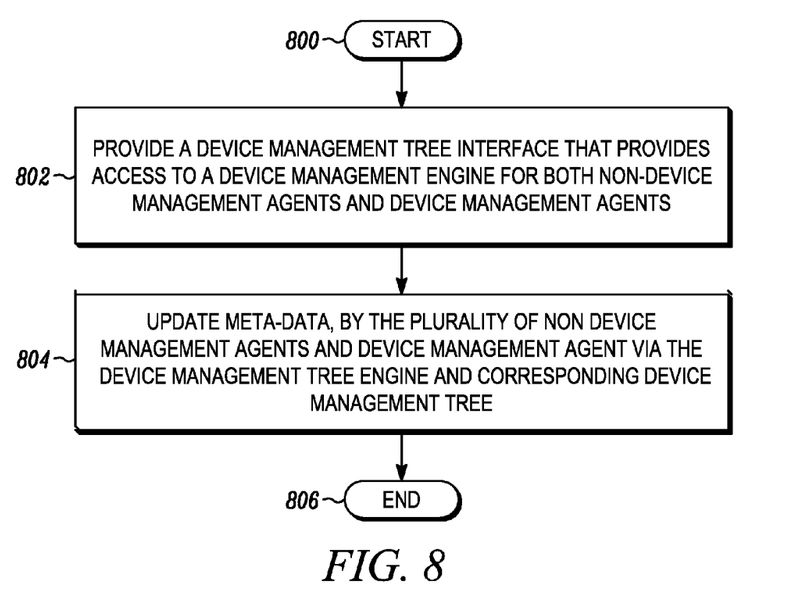
FIG. 8 is a flowchart illustrating one example of a method for a wireless client in accordance with one embodiment to the invention.

Referring also to FIG. 8, a flowchart illustrates one example of the method for client device of a communication system, such as the client device 701. As shown in block 800, the method starts when a client device 701 receives or has an agent request a read or write of data from the DM data store 704. The method includes, as shown in block 802, employing the device management tree interface 702 which generates access points to the device management tree engine 222 for both nondevice management agents and device management agent, such as OMADM agent 208. As shown in block 804, the method includes updating data in the DM data store 704 by the plurality of nondevice management agents and the device management agent, via the device management tree engine and the corresponding device management tree 226. This is done through the device management tree interface 702 for each of the agents seeking to access the DM data store 704. The method ends as shown in block 806 by awaiting another access request to the DM API 702 by one of the plurality of agents. As such, the DM API 702 is used as a single generic type of meta-data model for all agents in the system. The DMT226 semantics are encapsulated within a centralized and extensible DMT engine 222. The DMT engine 222 functionality is exposed through the DM API 702 to be used by all agents wishing to access the DM data store 704.

As shown in FIG. 7, each of the plurality of agents is in communication with the DM API 702 through a suitable communication link which may be in a form of a call, or any other suitable link shown by links 706, 708, 710, 712 and 714. The DM API 702 is in operative communication with the DMT engine 222 through a suitable communication link 716. Likewise the DMT engine 222 is in suitable communication through a communication link 718 (e.g. software link) with the device management tree 226. The device management engine 222 is also in operative communication through a suitable link 720 with the DM data store 704 to allow DMT engine 222 to access the DM data store to update the data stored therein.

The device management agent 208 as noted above configures a client device 701 via over the air control information to store at least some data in the DM data store 704 according to the device management tree 226 structure. Also in this example, nondevice management agents include, the client provisioning agent 210 the client device setting agent 618 a configurable application agent 619 and any other suitable agent other than the DM agent 208.

The device management tree engine 222 handles multiple device management tree queries from the plurality of nondevice management agents 618, 619, 210 and 620 as well as the device management agent 208. The device management tree 226 as known in the art defines a searchable hierarchical tree structure for storing data in a data base such as a DM data storer 704. The DMT engine 222 enforces a common set of meta-data value constraints by using the same device management tree 226 for all accesses to the DM data store 704 and enforces a set for meta-data value constraints independently of which of the plurality of nondevice management agents initiated the updating of data in the DM data store. The DMT engine 222 in combination with the DM API 702 enforce the common set of meta-data value constraints independently of which the plurality of JAVA applications cause the updating of the data in the device management tree.

Figure 9:
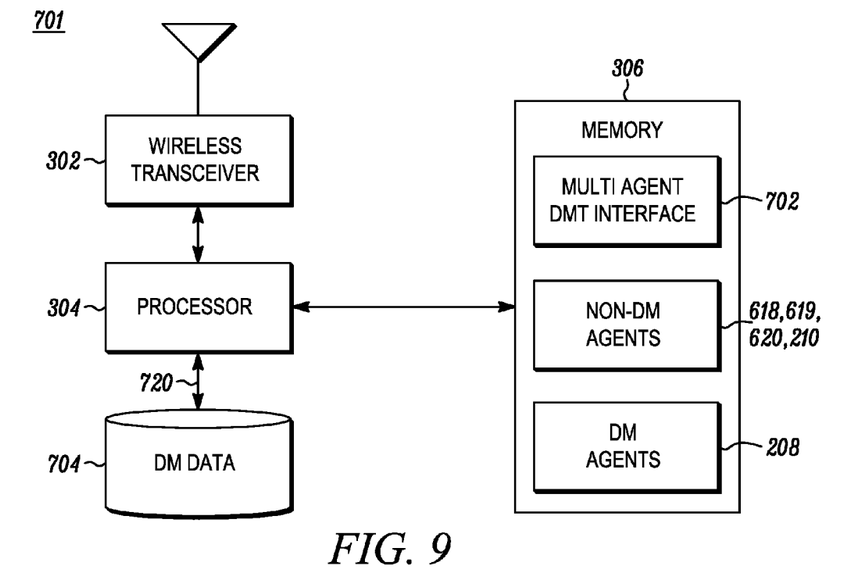
FIG. 9 is a functional block diagram illustrating one example of a client device in accordance with one embodiment to the invention.

FIG. 9 is a block diagram illustrating one example of the wireless client device 701. In this example, the multi-agent device management tree interface 702 is a software module stored in memory which when executed causes the processor for 304 to carry out the operations described herein with respect to the DM API 702. Likewise the nondevice management agents 618, 619, 620 and 210 may also be software applications stored in memory and executed by the processor 304. Also, the device management agent 208 may also be a software application suitably stored in memory 306 which when executed by the processor 304 causes the processor 304 to carry out the operations as described herein. As such the memory 306 contains executable instructions that were executed by the processor causing the processor to act as the device management engine and corresponding device management tree and act as the device management tree interface as described herein.

Among other advantages, a single access path represented by the DM API 702 allows the client device to guarantee device management data integrity efficient parallel access by multiple agents. Meta-data value constraints are universally enforced whether the data change is performed by the settings application by the user or by customer care agent via over the air control or other. Other advantages will be recognized by those of ordinary skill in the art.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for a client device of a communication system comprising:
   employing a device management tree interface in response to a request from a plurality of non device management agents and at least one device management agent, wherein the device management tree provides access for the plurality of non device management agents and the at least one device management agent to a device management engine that accesses a corresponding device management tree; and
   updating data, for the plurality of non device management agents and at least one device management agent, via the device management engine and corresponding device management tree, through the device management tree interface.

2. The method of claim 1 wherein the device management tree interface includes an application programming interface that provides access points for the plurality of non-device agents to the device management engine.

3. The method of claim 1 wherein the device management agent configures the client device based on over the air control information, at least some of which is stored according to the device management tree and wherein the plurality of non device management agents include a client provisioning agent and a client device settings agent.

4. The method of claim 1 wherein the device management tree engine handles multiple device management tree queries from the plurality of both non device management agents and the at least one device management agent.

5. The method of claim 4 including enforcing a common set of meta data value constraints independently of which of the plurality of non device management agents initiated the updating of the data via the device management engine.

6. The method of claim 1 wherein the plurality of non device management agents and the device management agent include JAVA applications.

7. The method of claim 6 including enforcing a common set of meta data value constraints independently of which of the plurality of JAVA applications caused the updating of the device management tree.

8. A wireless client device comprising:
   a wireless transceiver;
   a processor, operatively coupled to the wireless transceiver; and
   memory, operatively coupled to the processor, containing executable instructions that when executed by the processor, cause the processor to:
      provide a device management engine and corresponding device management tree;
      provide a device management tree interface that provides for a plurality of non device management agents and at least one device management agent to the device management engine that accesses the corresponding device management tree; and
      update data, in response to requests by the plurality of non device management agents and at least one device management agent, via the device management engine and corresponding device management tree, using the device management interface.

9. The wireless client device of claim 8 wherein the memory contains the updated data that is organized in a hierarchical relationship.

10. The wireless client device of claim 8 wherein the processor provides the device management tree interface under control of an application programming interface that generates access points for the plurality of non-device agents to the device management engine.

11. The wireless client device of claim 8 wherein the processor handles multiple device management tree queries from the plurality of both non device management agents and the at least one device management agent.

12. The wireless client device of claim 8 wherein the processor enforces a common set of meta data value constraints independently of which of the plurality of non device management agents initiated the updating of the data.

13. A wireless client device comprising:
   a wireless transceiver;
   a processor, operatively coupled to the wireless transceiver; and
   memory containing executable instructions that when executed by the processor, cause the processor to:
      operate with an operating system:
      provide a device management engine and corresponding device management tree;
      provide a device management tree interface that provides access points for a plurality of non device management agents and at least one device management agent to the device management engine that accesses the corresponding device management tree; and
      updates data, in response to requests by the plurality of non device management agents and at least one device management agent, via the device management engine and corresponding device management tree, through the device management tree interface.

14. The wireless client device of claim 13 wherein the processor, when acting as the device management engine, handles multiple device management tree queries from the plurality of both non device management agents and the at least one device management agent.

15. The wireless client device of claim 14 wherein the processor enforces a common set of meta data value constraints independently of which of the plurality of non device management agents initiated the updating of the data.

* * * * *